United States Patent
Lesko

(10) Patent No.: US 11,548,244 B2
(45) Date of Patent: Jan. 10, 2023

(54) LAMINATED PARTS CONTAINING A SLIP RESISTANT AND WATER RESISTANT OUTER LAYER AND METHODS FOR THEIR PRODUCTION

(71) Applicant: Covestro LLC, Pittsburgh, PA (US)

(72) Inventor: Merle W. Lesko, McDonald, PA (US)

(73) Assignee: Covestro LLC, Pittsburgh, PA (US)

(*) Notice: Subject to any disclaimer, the term of this patent is extended or adjusted under 35 U.S.C. 154(b) by 0 days.

(21) Appl. No.: 17/402,726

(22) Filed: Aug. 16, 2021

(65) Prior Publication Data

US 2021/0371611 A1 Dec. 2, 2021

Related U.S. Application Data

(63) Continuation of application No. 16/369,247, filed on Mar. 29, 2019, now Pat. No. 11,124,615.

(51) Int. Cl.

| | |
|---|---|
| *B29C 70/48* | (2006.01) |
| *B29C 70/86* | (2006.01) |
| *B32B 3/12* | (2006.01) |
| *B32B 29/02* | (2006.01) |
| *C08J 5/24* | (2006.01) |
| *B29K 75/00* | (2006.01) |
| *B29K 309/08* | (2006.01) |
| *B29L 31/30* | (2006.01) |

(52) U.S. Cl.
CPC ............. *B29C 70/48* (2013.01); *B29C 70/86* (2013.01); *B32B 3/12* (2013.01); *B32B 29/02* (2013.01); *C08J 5/244* (2021.05); *C08J 5/246* (2021.05); *B29K 2075/00* (2013.01); *B29K 2309/08* (2013.01); *B29L 2031/3017* (2013.01); *B32B 2260/046* (2013.01); *B32B 2262/101* (2013.01); *B32B 2605/003* (2013.01); *C08J 2375/04* (2013.01)

(58) Field of Classification Search
CPC .......... B29C 43/206; B29K 2075/00; B29K 2709/08; C08G 2101/00; C08G 18/4804; C08G 2115/02; B32B 2250/03; B32B 2250/40; B32B 2260/023; B32B 2260/046; B32B 2266/0278; B32B 2605/003; B32B 2605/08; B32B 2605/00; B32B 29/08; B32B 2262/06; B32B 2262/14; B32B 2262/106; B32B 2262/101
USPC ................ 428/295.1, 297.4, 297.1, 297.7
See application file for complete search history.

(56) References Cited

U.S. PATENT DOCUMENTS

| | | | |
|---|---|---|---|
| 4,218,543 A | 8/1980 | Weber et al. | |
| 5,391,344 A | 2/1995 | Rains et al. | |
| 6,156,811 A | 12/2000 | Lammeck et al. | |
| 6,197,242 B1 | 3/2001 | Parks et al. | |
| 6,761,953 B2 | 7/2004 | Haas et al. | |
| 7,419,713 B2 | 9/2008 | Wilkens et al. | |
| 7,972,676 B2 | 7/2011 | Kleba et al. | |
| 2003/0134085 A1 | 7/2003 | Haas et al. | |
| 2003/0148069 A1 | 8/2003 | Krebs et al. | |
| 2005/0208263 A1 | 9/2005 | Wilkens et al. | |
| 2011/0315310 A1 | 12/2011 | Trevisan et al. | |
| 2012/0003454 A1 | 1/2012 | Younes et al. | |
| 2012/0015574 A1 | 1/2012 | Severich et al. | |
| 2013/0136931 A1* | 5/2013 | James ................ B32B 27/12 428/423.1 |
| 2016/0090515 A1 | 3/2016 | Roock et al. | |

FOREIGN PATENT DOCUMENTS

| | | | |
|---|---|---|---|
| JP | S53139639 A | 12/1978 | |
| WO | WO-0132392 A1 * | 5/2001 | ......... B29C 44/0461 |
| WO | 2012015583 A1 | 2/2012 | |
| WO | 2017216251 A1 | 12/2017 | |

OTHER PUBLICATIONS

Emery Oleochemicals; Loxiol G 71 Lubricant Technical Data Sheet, Rev.-Nr. 3: Feb. 20, 2019; Green Polymer Additives.

* cited by examiner

*Primary Examiner* — Camie S Thompson
(74) *Attorney, Agent, or Firm* — Donald R. Palladino

(57) ABSTRACT

Laminated parts are described that include a core, a fiber layer arranged on each side of the core and impregnated with a polyurethane resin, and an outer layer that at least partially coats at least one of the polyurethane impregnated fiber layers, in which the outer layer is the cured reaction product of a reaction mixture that includes: (1) a polyisocyanate, (2) a polyether polyol having a molecular weight of 800 Da to 25,000 Da and a functionality of 2 to 8, and (3) a fatty acid ester having isocyanate-reactive functionality. Methods of producing such laminated parts are also described.

12 Claims, No Drawings

LAMINATED PARTS CONTAINING A SLIP RESISTANT AND WATER RESISTANT OUTER LAYER AND METHODS FOR THEIR PRODUCTION

CROSS-REFERENCE TO RELATION APPLICATION

This application is a continuation of U.S. patent application Ser. No. 16/369,247, which is incorporated herein by reference.

FIELD

This specification pertains generally to laminated parts that include outer layers and polyurethane sandwich materials, in which at least one of the outer layers is slip resistant and water resistant, as well as to methods for producing such parts, including use of such parts as a load floor in an automobile.

BACKGROUND

Fiber-reinforced sandwich panels are used to produce a variety of laminated automotive parts, such as load floors. These parts are sometimes produced by arranging a fiber layer on each side of a honeycomb core and then impregnating the fiber layer with a polyurethane resin that bonds the layers together. The part is then press molded under exposure to heat before the polyurethane resin cures. An outer layer of Class A surface quality may be positioned on one of the polyurethane impregnated fiber layers and a decorative layer, such as a textile layer, positioned on the other.

In some applications, however, it may be desired to replace such a textile layer with a waterproof and UV resistant coating having a Class A surface quality. To be viable, however, particularly for use in a load floor application, such a coating must exhibit good slip resistance. Otherwise, if the coating is slippery, objects placed on the load floor will easily slide within the vehicle, which is not desirable.

The production process used to produce such laminated parts, however, has been unfavorable to achieving such a slip resistant coating. This is because the internal surfaces of the mold used in the press molding operation must be coated with a mold release agent in order to be able to release the laminated part from the mold without damaging the part. The silicone-based mold release agents used to date in such applications, however, have a tendency to transfer to the part, making their outer surface slippery and causing a "streaking" appearance.

As a result, it would be highly desirable to provide a laminated part that is suitable for use as an automotive load floor, which has an outer coating that is waterproof and slip resistant and which has a Class A surface quality. A method for producing such a laminated part without the use of a silicone-based mold release agent is also highly desirable.

The present invention was made in view of the foregoing.

SUMMARY

In certain respects, the present disclosure relates to laminated parts. These laminated parts comprise: (a) a core; (b) a fiber layer arranged on each side of the core and impregnated with a polyurethane resin; and (c) an outer layer at least partially coating at least one of the polyurethane impregnated fiber layers. The outer layer is the cured reaction product of a reaction mixture comprising: (1) a polyisocyanate; (2) a polyether polyol having a molecular weight of 800 Da to 25,000 Da and a functionality of 2 to 8; and (3) 0.5 to 15% by weight, based on the total weight of the reaction mixture, of a fatty acid ester having an isocyanate-reactive functionality of at least 1.

In other respects, this disclosure relates to methods for making laminated parts. The methods comprise: (a) inserting a sandwich structure in a mold having a cavity therein, wherein at least a portion of the cavity defines a mold cavity surface having a non-reactive, silicone-free mold release agent deposited thereon, the sandwich structure comprising: (1) a core, and (2) a fiber layer arranged on each side of the core, each fiber layer being impregnated with a polyurethane resin; (b) closing the mold; (c) injecting a reaction mixture via a RIM process into the cavity; (d) allowing the reaction mixture to react in the closed mold to form an outer layer that at least partially coats at least one of the polyurethane impregnated fiber layers; (e) opening the mold; and (f) removing the laminated part from the opened mold. The reaction mixture used in such methods comprises: (1) a polyisocyanate; (2) a polyether polyol having a molecular weight of 1,800 Da to 12,000 Da and a functionality of at least 2; and (3) 0.5 to 15% by weight, based on the total weight of the reaction mixture, of a fatty acid ester having an isocyanate-reactive functionality of at least 1.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of a polyurethane, the hydroxyl groups react with isocyanate groups, —NCO, that are attached to an isocyanate compound. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol– Equivalent Weight (g/eq)=(56.1×1000)/OH number.

Equivalent weights and molecular weights given herein in Daltons (Da) are number average equivalent weights and number average molecular weights respectively, as determined, unless indicated otherwise, by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

As indicated, certain implementations of the present specification are directed to laminated parts. These laminated parts comprise a core. The core may be metal, plastic, natural material and/or paper. Suitable metals include aluminum, magnesium and alloys thereof. Suitable plastics include polyamides, polyesters, polycarbonates, polypropylene, polystyrene, ABS, polyamide imide (PAI) and mixtures thereof. The plastic can be reinforced or non-reinforced, filled or unfilled. Examples of natural materials are wood, flax, sisal, jute, and hemp. As used herein, the term "paper" refers to any type of paper, including multi-layer paper, cardboard, and resin-impregnated paper.

In certain implementations, the core has a large number of cavities. The cavities can be of any geometrical shape. They can be angular or round channels, pores or bubbles, for example. The cavities can be arranged regularly or irregularly. In some embodiments, the core has a corrugated, angled, honeycomb or foam-like profile. The core can, for example, be a corrugated metal or corrugated cardboard. Similar to a corrugated metal or corrugated cardboard, the core can also be angled rather than corrugated, with, for example, a rectangular or triangular shape. In addition, similar to a corrugated metal or corrugated cardboard, the core can also be made from plastic. An angled or corrugated plastic profile can be extruded, for example. A multi-wall sheet, for example, can also be used as a plastic core.

In some implementations, the core has a thickness of 5 to 50 millimeters. Due to the large number of cavities, the weight of the core is typically low in relation to its thickness. In some embodiments, the core has a density of 10 to 1000 $kg/m^3$.

The laminated parts of this specification comprise a fiber layer arranged on each side of the core. Suitable fiber layers include, but are not limited to, fiberglass mats, chopped fiberglass strand mats, random layers of fiberglass, fiberglass fabric, cut or ground glass or mineral fibers, natural fiber mats and knitted fabrics, cut natural fibers and fiber mats, non-wovens and knitted fabrics based on polymer, carbon or aramid fibers and mixtures thereof. Suitable natural materials for the fiber layers include, but are not limited to, flax, sisal, jute and hemp. The fiber layers on each side of the core can be the same or different.

These fiber layers are arranged on or applied to both sides of the core, and impregnated with polyurethane resin. The thickness of the fiber layers is, in some embodiments, 0.1 to 2 millimeters. The weight per unit area of the fiber layers is, in some embodiments, 225 to 1200 $g/m^2$.

A polyurethane resin at least partially penetrates the fiber layers and the core, thus impregnating the fiber layers. The polyurethane resin thus, in some embodiments, partially or entirely fills the cavities of the core. The polyurethane resin serves to bond together the layers, which are press molded under exposure to heat before the polyurethane resin cures. The polyurethane resin fixes the fibers and forms the surface of a composite component, giving it a high strength and rigidity by bonding the layers together. This composite, comprising a core and a fiber layer arranged on each side of the core that is impregnated with a polyurethane resin is also referred to herein as a "sandwich structure".

The polyurethane resin system can be a one-component or multi-component system, e.g., a two-component system. It can be foaming or non-foaming.

In some implementations, the polyurethane resin comprises the reaction product of a reaction mixture comprising: (1) at least one polyisocyanate; (2) at least one polyol constituent with an average OH number from 300 to 700, comprising, in some embodiments, at least one short-chain and one long-chain polyol, the initial polyols having a functionality of 2-6; (3) water; (4) activators; (5) stabilizers; and, optionally, (6) other auxiliary materials, mold release agents and additives.

Suitable polyol constituents include, but are not limited to, polyols with at least two hydrogen atoms which are reactive with isocyanate groups, such as polyester polyols and polyether polyols.

Suitable polyisocyanates include, but are not limited to, polymeric isocyanates of the diphenylmethane disocyanate series (pMDI types), prepolymers thereof, or crude MDI.

In certain embodiments, water is employed in an amount of 0.1 to 3.0, such as 0.3 to 2.0 parts, per 100 parts of the polyol formulation.

Normal activators for the expansion and crosslinking reaction such as, for example, amines or metal salts may be used for catalysis.

Suitable foam stabilizers include polyether siloxanes, including water-soluble polyether siloxanes. These compounds generally have a copolymer of ethylene oxide and propylene oxide combined with a polydimethylsiloxane radical. Foam stabilizers of this type are described in, for example, U.S. Pat. Nos. 2,834,748, 2,917,480 and 3,629,308, the disclosures of which are herein incorporated by reference. Polysiloxane-polyoxyalkylene copolymers branched by allophanate groups as described in U.S. Pat. Nos. 4,096,162 and 4,163,830, the disclosures of which are herein incorporated by reference, are also suitable.

Other organopolysiloxanes, oxyethylated alkyl phenols, oxyethylated fatty alcohols, paraffin oils, esters of castor oil or ricinoleic acid, Turkey red oil and groundnut oil and cell regulators such as paraffins, fatty alcohols and dimethylpolysiloxanes are also suitable. Oligomeric polyacrylates with polyoxyalkylene and fluoroalkane radicals as side groups are further suitable for improving and/or stabilising the emulsifying action, dispersal of the filler, and the cellular structure. Surfactants are normally employed in quantities of 0.01 to 5 parts by weight per 100 parts by weight of polyol.

Other auxiliary materials, mold release agents and additives may optionally be incorporated in the reaction mixture for preparing the polyurethane resin. These include, for example, surface-active additives such as emulsifiers, flame retardants, chain extenders, crosslinking agents, nucleating agents, oxidation retardants, lubricants and mold release agents, dyes, dispersing aids and pigments.

The constituents are reacted in quantities such that, in some embodiments, the equivalence ratio of NCO groups in the polyisocyanate component (1) to the sum of the hydrogens in constituents (2) and (3), and possibly (5), which are reactive with isocyanate groups, is from 0.8:1 to 1.4:1, such as 0.9:1 to 1.3:1.

In some embodiments, the weight per unit area of the cured polyurethane is 400 to 1200 g/m$^2$.

The foregoing sandwich structures can be produced by, for example, applying a fiber layer to each side of the core and applying the initial polyurethane constituents to the fiber layers. Alternatively, fibers may be introduced onto the core through the flow of raw polyurethane materials, using a suitable mixer head technique. The polyurethane resins may be produced by, for example, the one-shot or prepolymer process.

As previously indicated, the laminated parts of this specification also include an outer layer that at least partially coats at least one of the polyurethane impregnated fiber layers. The outer layer is the cured reaction product of a reaction mixture comprising an organic di- and/or polyisocyanate (sometimes collectively referred to herein as "isocyanate").

Suitable isocyanates include aliphatic, cycloaliphatic, araliphatic, aromatic and heterocyclic polyisocyanates. Examplary isocyanates are those of the formula:

$$Q(NCO)_n$$

in which n is 2, 3 or 4 and Q is an aliphatic hydrocarbon radical with 2 to 18, such as 6 to 10 carbon atoms, a cycloaliphatic hydrocarbon radical with 4 to 15, such as 5 to 10 carbon atoms, an aromatic hydrocarbon radical with 6 to 15, such as 6 to 13 carbon atoms, or an araliphatic hydrocarbon radical with 8 to 15, such as 8 to 13 carbon atoms.

In some embodiments, the isocyanate comprises ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3- and -1,4-cyclohexane diisocyanate and any mixtures of these isomers, 1-isocyanato-3,3,5-trimethyl-5-isocyanatomethyl cyclohexane, 2,4- and 2,6-hexahydrotoluylene diisocyanate and any mixtures of these isomers, hexahydro-1,3- and -1,4-phenylene diisocyanate, perhydro-2,4'- and -4,4'-diphenylmethane diisocyanate, 1,3- and 1,4-phenylene diisocyanate, 1,4-durene diisocyanate (DDI), 4,4'-stilbene diisocyanate, 3,3'-dimethyl-4,4'-biphenylene diisocyanate (TODI) 2,4- and 2,6-toluylene diisocyanate (TDI) and any mixtures of these isomers, diphenylmethane-2,4'- and/or -4,4'-diisocyanate (MDI), naphthylene-1,5-diisocyanate (NDI), or a mixture of any two or more thereof.

Other suitable isocyanates include triphenylmethane-4,4', 4"-triisocyanate, polyphenyl-polymethylene polyisocyanates, as obtained by condensation of aniline with formaldehyde and subsequent phosgenation, m- and p-isocyanatophenylsulfonyl isocyanates, perchlorinated aryl polyisocyanates, polyisocyanates having carbodiimide groups, norbornane diisocyanates, polyisocyanates having allophanate groups, polyisocyanates having isocyanurate groups, polyisocyanates having urethane groups, polyisocyanates having acylated urea groups, polyisocyanates having biuret groups, polyisocyanates produced by telomerisation reactions, polyisocyanates having ester groups, reaction products of the above-mentioned isocyanates with acetals and polyisocyanates containing polymer fatty acid esters.

It is of course possible to use mixtures of any two or more of the above-named polyisocyanates.

In some embodiments, however, the isocyanate comprises 2,4- and 2,6-toluylene diisocyanate and any mixtures of these isomers ("TDI"), 4,4'-diphenylmethane diisocyanate, 2,4'-diphenylmethane diisocyanate, 2,2'-diphenylmethane diisocyanate and polyphenyl-polymethylene polyisocyanates which are produced by condensation of aniline with formaldehyde and subsequent phosgenation ("crude MDI"), and polyisocyanates having carbodiimide groups, uretonimine groups, urethane groups, allophanate groups, isocyanurate groups, urea groups or biuret groups ("modified polyisocyanates"), in particular such modified polyisocyanates that are derived from 2,4- and/or 2,6-toluylene diisocyanate or from 4,4'- and/or 2,4'-diphenylmethane diisocyanate. Naphthylene-1,5-diisocyanate and mixtures of the polyisocyanates named are also suitable.

In some embodiments, the isocyanate comprises a prepolymer having isocyanate groups which are produced by reacting a polyol and/or chain extender and/or crosslinking agent with at least one aromatic diisocyanate from the group TDI, MDI, TODI, DIBDI, NDI, and DDI, such as 4,4'-MDI to product a polyaddition product having urethane groups and isocyanate groups with an NCO content of 6 to 25 wt. %.

In certain implementations, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of 20 to 32 weight percent.

The reaction mixture used to form the outer layer that at least partially coats at least one of the polyurethane impregnated fiber layers also comprises a polyether polyol having a molecular weight of 800 Da to 25,000 Da, such as 800 to 14,000 Da, or, in some cases, 1,000 to 8,000 Da, and a functionality of 2 to 8, such as 2.4 to 8, or 2.5 to 3.5.

Specific examples of suitable polyether polyols having a molecular weight and functionality within the above-described ranges include polyoxyethylene glycols, triols, tetrols and higher functionality polyoxyethylene polyols, polyoxypropylene glycols, triols, tetrols and higher functionality polyoxyethylene polyols, and mixtures thereof. When mixtures are used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylol-propane, glycerin, pentaerythritol, sorbitol, sucrose, ethylenediamine, and toluene diamine, as well as mixtures of any two or more thereof. The alkoxylation reaction may be catalyzed using any conventional catalyst including, for example, potassium hydroxide (KOH) or a double metal cyanide (DMC) catalyst.

Other suitable polyether polyols include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside and ethyl glucoside, glycol glucosides, such as ethylene glycol glycoside, propylene glycol glucoside, glycerol glucoside, and 1,2,6-hexanetriol glucoside, as well as alkylene oxide adducts of the alkyl glycosides.

Other suitable polyether polyols include polyphenols, such as the alkylene oxide adducts thereof, wherein the alkylene oxides have from 2 to 4 carbon atoms. Among the polyphenols which are suitable are, for example, bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis(hydroxyphenol)ethanes.

The alkylene oxide adducts of phosphorus and polyphosphorus acid are also suitable. These include ethylene oxide, 1,2-epoxy-propane, the epoxybutanes, 3-chloro-1,2-epoxypropane as alkylene oxides. Phosphoric acid, phosphorus acid, polyphosphoric acids, such as tripolyphosphoric acid, and the polymetaphosphoric acids are suitable.

In certain implementations, the polyether polyol having a molecular weight of 800 Da to 25,000 Da, such as 800 to 14,000 Da, or, in some cases, 1,000 to 8,000 Da, and a functionality of 2 to 8, such as 2.4 to 8, or 2.5 to 3.5, is present in an amount of at least 50% by weight, such as at least 80% by weight, based on the total weight of isocyanate-reactive ingredients in the reaction mixture.

In addition, low-molecular difunctional chain extenders, tri- or tetrafunctional crosslinking agents or mixtures of chain extenders and crosslinking agents can be present in the reaction mixture used to form the outer layer. Suitable chain extenders such as alkanediols, dialkylene glycols and polyalkylene polyols and crosslinking agents, such as, for example, 3- or 4-valent alcohols and oligomer polyalkylene polyols with a functionality of 3 to 4, usually have molecular weights of <750 g/mol, such as 18 to 400 g/mol or 60 to 300 g/mol. Alkanediols with 2 to 12, such as 2, 4 or 6 carbon atoms, including ethanediol, 1,6-hexanediol, 1,7-heptanediol, 1,8-octanediol, 1,9-nonanediol, 1,10-decanediol, 1,4-butanediol, and dialkylene glycols with 4 to 8 carbon atoms, such as diethylene glycol and dipropylene glycol and polyoxyalkylene glycols are suitable chain extenders. Branched-chain and/or unsaturated alkanediols with usually not more than 12 carbon atoms, such as, for example, 1,2-propanediol, 2-methyl-1,3-propanediol, 2,2-dimethyl-1,3-propanediol, 2-butyl-2-ethyl-1,3-propanediol, 2-butene-1,4-diol and 2-butyne-1,4-diol, diesters of terephthalic acid with glycols with 2 to 4 carbon atoms, such as terephthalic acid-bis-ethylene glycol or terephthalic acid-bis-1,4-butanediol, hydroxyalkylene ethers of hydroquinone or resorcinol, such as 1,4-di-(.beta.-hydroxyethyl)-hydroquinone or 1,3-(.beta.-hydroxyethyl)-resorcinol, alkanolamines with 2 to 12 carbon atoms such as ethanolamine, 2-aminopropanol and 3-amino-2,2-dimethylpropanol, N-alkyldialkanolamines, such as N-methyl- and N-ethyl diethanolamine, (cyclo)aliphatic diamines with 2 to 15 carbon atoms, such as 1,2-ethylenediamine, 1,3-propylenediamine, 1,4-butylenediamine and 1,6-hexamethylenediamine, isophoronediamine, 1,4-cyclohexamethylenediamine and 4,4'-diaminodicyclohexylmethane, N-alkyl-, N,N'-dialkyl-substituted and aromatic diamines which can also be substituted on the aromatic radical by alkyl groups, with 1 to 20, such as 1 to 4 carbon atoms in the N-alkyl radical, such as N,N'-diethyl-, N,N'-di-sec.-pentyl-, N,N'-di-sec.-hexyl-, N,N'-di-sec.-decyl- and N,N'-dicyclohexyl-, (p- or m-)-phenylene diamine, N,N'-dimethyl-, N,N'-diethyl-, N,N'-diisopropyl-, N,N'-di-sec.-butyl-, N,N'-dicyclohexyl-, 4,4'-diamino-diphenylmethane, N,N'-di-sec.-butylbenzidine, methylene-bis(4-amino-3-benzoic acid methyl ester), 2,4- chloro-4,4'-diamino-diphenylmethane, 2,4- and 2,6-toluylene diamine, are also suitable.

In certain implementations, the chain extender and/or crosslinking agent is present in an amount of no more than 50% by weight, such as no more than 20% by weight, such as 1 to 50% by weight or 2 to 20% by weight, based on the total weight of isocyanate-reactive ingredients in the reaction mixture.

As indicated, the reaction mixture used to form the outer layer in the laminated parts of this specification comprise 0.5 to 15% by weight, such as 0.5 to 5% by weight, of a fatty acid ester lubricant. As will be appreciated, a "fatty acid ester" is a product that results from the esterification of an alcohol with a fatty acid.

Suitable fatty acid esters include, without limitation, the ester reaction product of a fatty acid having 5 to 32 carbon atoms, such as 12 to 22 carbon atoms, with a monhydric or polyhydric alcohol having 2 to 30 carbon atoms, such as 2 to 22 carbon atoms.

Specific examples of suitable fatty acids include saturated fatty acids, such as caproic acid, caprylic acid, undecylic acid, lauric acid, tridecylic acid, myristic acid, stearic acid, behenic acid, lignoceric acid, cerotic acid, montanic acid, and melissic acid, and unsaturated fatty acids, such as oleic acid, elaidic acid, linolic acid, linolenic acid, arachidonic acid, brassidic acid, erucic acid, and ricinolic acid, as well as mixtures of any two or more thereof. Specific examples of suitable alcohols for forming the ester include monols, such a propyl, isopropyl, butyl, octyl, capryl, lauryl, myristyl, stearyl, and behenyl alcohols, and polyols, such as ethylene glycol, propylene glycol, butanediol, glycerin, trimethylol propane, pentaerythritol, isotridecanol, and neopentyl glycol, as well as mixtures of any two or more thereof.

The fatty acid ester lubricant used in the reaction mixture used to form the outer layer has an isocyanate-reactive, such as hydroxyl, functionality of at least 1, such as from 1 to 2. In certain implementations, the fatty acid ester lubricant has a hydroxyl number of at least 10 mg KOH/gram, such as 10 to 50 mg KOH/gram or 10 to 20 mg KOH/gram.

It was discovered that inclusion of a fatty acid ester lubricant, in the amounts described above, allowed for the effective use of a non-reactive, silicon-free, non-transferring, non-marking external mold release agent on the mold cavity surface, as described below, but, surprisingly, it did not cause the surface of the resulting outer layer to lack the slip resistance needed for use of the resulting laminated part as, for example, a load floor in an automobile. This was unexpected because fatty acid esters are known for use as a lubricant for imparting anti-frictional slip or sliding properties to polymers. Moreover, it was discovered to be possible to produce an outer layer having a weather able and Class A type surface without "streaking" resulting from external mold release agent being transferred from a mold cavity surface onto the outer layer of the laminated part.

The reaction mixture used to form the outer layer may further comprise other ingredients, such as catalysts and other additives.

Suitable catalysts include amine catalysts, such as tertiary amines. Exemplary tertiary amines include triethylamine, tributylamine, N-methyl morpholine, N-ethyl morpholine, N,N,N',N'-tetramethyl ethylenediamine, pentamethyl diethylene triamine and higher homologs, 1,4-diazabicyclo-[2,2,2]-octane, N-methyl-N'-dimethylaminoethyl piperazine, bis-(dimethylaminoalkyl) piperazine, N,N'-dimethylbenzylamine, N,N-dimethylcyclohexylamine, N,N-diethylbenzylamine, bis-(N,N-diethylaminoethyl) adipate, N,N,N',N'-tetramethyl-1,3-butane diamine, N,N-dimethyl-B-phenyl-ethylamine, bis-(dimethylaminopropyl) urea, bis-(dimethylaminopropyl) amine, 1,2-dimethylimidazole, 2-methylimidazole, monocyclic and bicyclic amidines, bis-(dialkylamino)-alkylethers, such as e.g. bis(dimethylaminoethyl) ethers, and tertiary amines having amide groups (such as formamide groups). Mannich bases composed of secondary amines, such as dimethylamine and aldehydes, such as formaldehyde, or ketones such as acetone, methylethylketone or cyclohexanone and phenols, such as phenol, nonylphenol or bisphenol, are also suitable as catalysts. Tertiary amines having hydrogen atoms active in relation to isocyanate groups as catalyst are, for example, triethanolamine, triisopropanolamine, N-methyldiethanolamine, N-ethyldiethanolamine, N,N-dimethyl ethanolamine, the reaction products thereof with alkylene oxides such as propylene oxide and/or ethylene oxide and secondary-tertiary amines. Amines with carbon-silicon bonds such as 2,2,4-trimethyl-2-silamorpholine and 1,3-diethylaminomethyl tetramethyl disiloxane, can be used as catalysts. In addition, nitrogen-containing bases such as tetraalkylammonium hydroxides, furthermore hexahydrotriazines, are also suitable catalysts.

Metal catalysts may be used in addition to, or in lieu of, the foregoing amine catalysts. Specific examples of such catalysts include organic metal compounds of tin, titanium, bismuth, in particular organic tin compounds. Tin(II) salts of carboxylic acids, such as tin(II) acetate, tin(II) octoate, tin(II) ethyl hexoate, tin(II) laurate and tin(IV) compounds, such as dibutyl tin oxide, dibutyl tin dichloride, dibutyl tin diacetate, dibutyl tin dilaurate, dibutyl tin maleate or dioctyl tin diacetate, may be employed.

Various other additives may be included in the reaction mixture that forms the outer layer. These include, without limitation, emulsifiers, foam stabilizers, cell regulators, flame retardants, UV stabilizers, nucleating agents, oxidation retarders, stabilizers, colorants, dispersing agents and pigments.

Certain embodiments of the present specification are directed to methods for making laminated parts. These methods comprise providing a mold having a cavity therein. Suitable molds include, for example, those made of aluminum or steel or metal-sprayed epoxide molds.

To improve demolding, the internal walls of the mold being used are optionally coated with an external mold release agent. In fact, one feature of the methods of this specification is utilization of a non-reactive, silicone-free, external mold release agent, such as a non-transferring wax. In fact, it was discovered that use of a particular combination of a reaction mixture that includes a fatty acid ester having an isocyanate-reactive functionality of at least 1, such as a functionality of 1 to 2, as described above, and use of a non-reactive, silicone-free, external mold release agent, such as a non-transferring wax, enabled the production of up to 15 laminated parts with an outer layer has an outer coating that was waterproof, slip resistant, and of Class A type surface quality, all without further application of external mold release being applied.

As will be appreciated, because of its inherent lubricious qualities, many release agents use silicone as a base component. Silicone-based release agents, however, have several drawbacks. First, painting or gluing a component directly after molding is not possible because silicone residue that remains on the component does not allow paint or adhesives to form a bond with the component. The component requires thorough cleaning before paint or glue will stick to it, which is undesirable for time and cost reasons. Second, silicone-based release agents cause the surface of parts to feel oily. Third, many silicone-based release agents are reactive with polyurethane-forming components used in the outer layer described herein, making them adhere better to the polyurethane layer than to the tool, resulting in their removal from the tool (while remaining stuck to the outer layer) when the laminated part is removed from the tool.

According to the methods of this specification a sandwich structure of the type described earlier is inserted in the mold cavity and the mold is then closed. An outer layer that at least partially coats at least one of the polyurethane impregnated fiber layers of the sandwich structure is then produced by using a reaction injection molding technique (RIM process). In certain implementations, the quantity of the components of the reaction mixture to form the outer layer(s) is selected so that the reaction mixture has an isocyanate index of 70 to 130, such as 80 to 120, or 90 to 110. As will be appreciated, "isocyanate index" means the quotient of the number of isocyanate groups and number of isocyanate-reactive groups multiplied by 100.

In some embodiments, the initial temperature of the reaction mixture introduced into the mold is within the range of 20 to 80° C., such as 30 to 70° C. and, in some embodiments, the temperature of the mold is within the range of 30 to 130° C., such as 40 to 80° C.

The methods of this specification comprise allowing the reaction mixture to react in the mold to form an outer layer that at least partially coats at least one of the polyurethane impregnated fiber layers and then removing the laminated part from the mold. In some embodiments, the molded laminated part is removed from the mold, i.e., demolded after a mold dwell time of from 5 to 180 seconds. In some cases, conditioning at a temperature of about 60 to 180° C. for a period of 30 to 120 minutes may follow demolding.

As indicated, the outer layer described herein at least partially coats at least one of the polyurethane impregnated fiber layers. In some embodiments, the outer layer at least partially coats both of the polyurethane fiber layers. In some embodiments, the outer layer described herein entirely, or substantially entirely, coats one or both of the polyurethane impregnated fiber layers. In cases where the outer layer described herein does not at least partially coat one of the polyurethane impregnated fiber layer, such layer may, if desired, have another layer, such as a decorative layer deposited thereon. Such a layer may comprise, for example, a metal foil or sheet, a compact thermoplastic composite made of, for example, PMMA (polymethyl methacrylate), ASA (acrylic ester modified styrene acrylonitrile terpolymer), PC (polycarbonate), PA (polyamide), PBT (polybutylene terephthalate) and/or PPO (polyphenylene oxide). Alternative, such a layer may be a constructed of a textile material with a barrier of TPU (thermoplastic polyurethane) sheeting, compact or foamed plastic sheets and other spray-on or RIM polyurethane skins.

Some suitable applications of the laminated parts of this specification within the automotive industry include, for example, roof, bonnet, rear wing, door or bottom plate modules, as well as load floors.

Various aspects of the subject matter described herein are set out in the following numbered clauses:

Clause 1. A laminated part comprising: (a) a core; (b) a fiber layer arranged on each side of the core and impregnated with a polyurethane resin, and (c) an outer layer at least partially coating at least one of the polyurethane impregnated fiber layers. The outer layer is the cured reaction product of a reaction mixture comprising: (1) a polyisocyanate; (2) a polyether polyol having a molecular weight of 800 Da to 25,000 Da and a functionality of 2 to 8; and (3) 0.5 to 15% by weight, based on the total weight of the reaction mixture, of a fatty acid ester having an isocyanate-reactive functionality of at least 1.

Clause 2. The laminated part of clause 1, wherein the core is constructed of metal (such as aluminum, magnesium, or an alloy thereof), reinforced, non-reinforced, filled or unfilled plastic (such as a polyamide, polyester, polycarbonate, polypropylene, polystyrene, ABS, polyamide imide (PAI) or a mixture thereof), natural material (such as wood, flax, sisal, jute, hemp or a mixture thereof) and/or paper (such as multi-layer paper, cardboard, resin-impregnated paper or a mixture thereof).

Clause 3. The laminated part of clause 1 or clause 2, wherein the core comprises cavities, such as angular or round channels, pores or bubbles.

Clause 4. The laminated part of one of clause 1 to clause 3, wherein the core has a corrugated, angled, honeycomb or foam-like profile, such as corrugated metal or corrugated cardboard.

Clause 5. The laminated part of one of clause 1 to clause 4, wherein the core has a thickness of 5 to 50 millimeters and/or the core has a density of 10 to 1000 kg/m$^3$.

Clause 6. The laminated part of one of clause 1 to clause 5, wherein the fiber layer comprises a fiberglass mat, a chopped fiberglass strand mat, a random layer of fiberglass, a fiberglass fabric, cut or ground glass or mineral fibers, a natural fiber mat, a knitted fabric, a cut natural fiber or fiber mat, a non-woven or knitted fabric based on polymer, carbon or aramid fibers, or a mixture thereof, such as where the natural fiber comprises flax, sisal, jute, hemp or a mixture thereof.

Clause 7. The laminated part of one of clause 1 to clause 6, wherein the thickness of the fiber layer is 0.1 to 2 millimeters and/or the weight per unit area of the fiber layers is 225 to 1200 g/m$^2$.

Clause 8. The laminated part of one of clause 1 to clause 7, wherein the polyurethane resin partially or entirely fills cavities of the core.

Clause 9. The laminated part of one of clause 1 to clause 8, wherein the polyurethane is formed from a one-component or multi-component polyurethane forming system and is foaming or non-foaming.

Clause 10. The laminated part of one of clause 1 to clause 9, wherein the polyurethane is a polyurethane resin comprising the reaction product of a reaction mixture comprising: (1) at least one polyisocyanate; (2) at least one polyol constituent with an average OH number from 300 to 700, comprising, in some embodiments, at least one short-chain and one long-chain polyol, the initial polyols having a functionality of 2-6; (3) water; (4) activators; (5) stabilizers; and, optionally, (6) other auxiliary materials, mold release agents and additives, such as where the polyol constituent comprises a polyester polyol and/or a polyether polyol, the polyisocyanate comprises a polymeric isocyanate of the diphenylmethane disocyanate series (pMDI types), a prepolymer thereof, or crude MDI, water is employed in an amount of 0.1 to 3.0, such as 0.3 to 2.0 parts, per 100 parts of the polyol formulation, the activators comprises an amine or metal salt, and/or the stabilizer comprises polyether siloxane, such as a water-soluble polyether siloxane.

Clause 11. The laminated part of one of clause 1 to clause 10, wherein the weight per unit area of the polyurethane is 400 to 1200 g/m$^2$.

Clause 12. The laminated part of one of clause 1 to clause 11, wherein the polyisocyanate comprises an aliphatic, cycloaliphatic, araliphatic, aromatic and/or heterocyclic polyisocyanate, such as those of the formula:

$$Q(NCO)_n$$

in which n is 2, 3 or 4 and Q is an aliphatic hydrocarbon radical with 2 to 18, such as 6 to 10 carbon atoms, a cycloaliphatic hydrocarbon radical with 4 to 15, such as 5 to 10 carbon atoms, an aromatic hydrocarbon radical with 6 to 15, such as 6 to 13 carbon atoms, or an araliphatic hydrocarbon radical with 8 to 15, such as 8 to 13 carbon atoms.

Clause 13. The laminated part of one of clause 1 to clause 12, wherein the polyisocyanate comprises ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3- and -1,4-cyclohexane diisocyanate and any mixtures of these isomers, 1-isocyanato-3,3,5-trimethyl-5-isocyanatomethyl cyclohexane, 2,4- and 2,6-hexahydrotoluylene diisocyanate and any mixtures of these isomers, hexahydro-1,3- and -1,4-phenylene diisocyanate, perhydro-2,4'- and -4,4'-diphenylmethane diisocyanate, 1,3- and 1,4-phenylene diisocyanate, 1,4-durene diisocyanate (DDI), 4,4'-stilbene diisocyanate, 3,3'-dimethyl-4,4'-biphenylene diisocyanate (TODI), 2,4- and 2,6-toluylene diisocyanate (TDI) and any mixtures of these isomers, diphenylmethane-2,4'- and/or -4,4'-diisocyanate (MDI), naphthylene-1,5-diisocyanate, triphenylmethane-4,4',4''-triisocyanate, polyphenyl-polymethylene polyisocyanates, as obtained by condensation of aniline with formaldehyde and subsequent phosgenation, m- and p-isocyanatophenylsulfonyl isocyanates, perchlorinated aryl polyisocyanates, polyisocyanates having carbodiimide groups, norbornane diisocyanates, polyisocyanates having allophanate groups, polyisocyanates having isocyanurate groups, polyisocyanates having urethane groups, polyisocyanates having acylated urea groups, polyisocyanates having biuret groups, polyisocyanates produced by telomerisation reactions, polyisocyanates having ester groups, reaction products of the above-mentioned isocyanates with acetals and polyisocyanates containing polymer fatty acid esters, or a mixture of any two or more of the above-named polyisocyanates.

Clause 14. The laminated part of one of clause 1 to clause 13, wherein the polyisocyanate comprises a prepolymer having isocyanate groups produced by reacting a polyol and/or chain extender and/or crosslinking agent with at least one aromatic diisocyanate from the group TDI, MDI, TODI, DIBDI, NDI, DDI, such as 4,4'-MDI, to produce a polyaddition product having urethane groups and isocyanate groups with an NCO content of 6 to 25 wt. %.

Clause 15. The laminated part of one of clause 1 to clause 14, wherein the polyisocyanate comprises a methylene-bridged polyphenyl polyisocyanate and/or a prepolymer of a methylene-bridged polyphenyl polyisocyanate having an average functionality of from 1.8 to 3.5, such as from 2.0 to 3.1, isocyanate moieties per molecule, and an NCO content of from 20 to 32 weight percent.

Clause 16. The laminated part of one of clause 1 to clause 15, wherein the polyether polyol has a molecular weight of 800 to 14,000 Da or 1,000 to 8,000 Da, and/or a functionality of 2.4 to 8 or 2.5 to 3.5.

Clause 17. The laminated part of one of clause 1 to clause 16, wherein the polyether polyol comprises a polyoxyethylene glycol, triol, tetrol or higher functionality polyoxyethylene polyol, a polyoxypropylene glycol, triol, tetrol or higher functionality polyoxyethylene polyol, or a mixture of any two or more thereof, such as where the polyether polyol is produced from a starter or initiator comprising ethylene glycol, propylene glycol, diethylene glycol, dipropylene glycol, tripropylene glycol, trimethylol-propane, glycerol, pentaerythritol, sorbitol, sucrose, ethylenediamine, and toluene diamine, or a mixture of any two or more thereof.

Clause 18. The laminated part of one of clause 1 to clause 17, wherein the reaction mixture comprises a low-molecular difunctional chain extender, tri- or tetrafunctional crosslinking agent, or a mixture of chain extender and crosslinking agent, such as where the chain extender comprises an alkanediol or a dialkylene glycol, and the crosslinking agent comprises a 3- or 4-valent alcohol and/or an oligomeric polyalkylene polyol with a functionality of 3 to 4 and a molecular weights of <750 g/mol, such as 18 to 400 g/mol or 60 to 300 g/mol.

Clause 19. The laminated part of clause 18, where the chain extender and/or crosslinking agent is present in an amount of no more than 50% by weight, such as no more than 20% by weight, such as 1 to 50% by weight or 2 to 20% by weight, based on the total weight of isocyanate-reactive ingredients in the reaction mixture.

Clause 20. The laminated part of one of clause 1 to clause 19, wherein the fatty acid ester is present in an amount of 0.5 to 5% by weight, based on the total weight of the reaction mixture.

Clause 21. The laminated part of one of clause 1 to clause 20, wherein the fatty acid ester comprises the ester reaction product of a fatty acid having 5 to 32 carbon atoms, such as 12 to 22 carbon atoms, with a monhydric or polyhydric alcohol having 2 to 30 carbon atoms, such as 2 to 22 carbon atoms, such as where the fatty acid comprises a saturated fatty acid, such as caproic acid, caprylic acid, undecylic acid, lauric acid, tridecylic acid, myristic acid, stearic acid, behenic acid, lignoceric acid, cerotic acid, montanic acid, and/or melissic acid, and/or an unsaturated fatty acid, such as oleic acid, elaidic acid, linolic acid, linolenic acid, arachidonic acid, brassidic acid, erucic acid, and/or ricinolic acid, as well as mixtures of any two or more thereof, and/or where the alcohol comprises a monol, such a propyl, isopropyl, butyl, octyl, capryl, lauryl, myristyl, stearyl, and behenyl alcohol, and/or a polyol, such as ethylene glycol, propylene glycol, butanediol, glycerin, trimethylol propane, pentaerythritol, isotridecanol, and neopentyl glycol, as well as mixtures of any two or more thereof.

Clause 22. The laminated part of one of clause 1 to clause 21, wherein the fatty acid ester has an isocyanate-reactive, such as hydroxyl, functionality of 1 to 2 and/or a hydroxyl number of at least 10 mg KOH/gram, such as 10 to 50 mg KOH/gram or 10 to 20 mg KOH/gram.

Clause 23. The laminated part of one of clause 1 to clause 22, wherein the laminated part is a roof, bonnet, rear wing, door or bottom plate module, or load floor.

Clause 24. A method for making a laminated part, comprising: (a) inserting a sandwich structure in a mold having a cavity therein, wherein at least a portion of the cavity defines a mold cavity surface having a non-reactive, silicone-free mold release agent deposited thereon, the sandwich structure comprising: (1) a core, and (2) a fiber layer arranged on each side of the core, each fiber layer being impregnated with a polyurethane resin; (b) closing the mold; (c) injecting a reaction mixture via a RIM process into the cavity; (d) allowing the reaction mixture to react in the closed mold to form an outer layer that at least partially coats at least one of the polyurethane impregnated fiber layers; (e) opening the mold; and (f) removing the laminated part from the opened mold, wherein the reaction mixture comprises: (1) a polyisocyanate; (2) a polyether polyol having a molecular weight of 1,800 Da to 12,000 Da and a functionality of at least 2; and (3) 0.5 to 15% by weight, based on the total weight of the reaction mixture, of a fatty acid ester having an isocyanate-reactive functionality of at least 1.

Clause 25. The method of clause 24, wherein the non-reactive, silicone-free mold release agent comprises a non-transferring wax.

Clause 26. The method of clause 25, wherein the core is constructed of metal (such as aluminum, magnesium, or an alloy thereof), reinforced, non-reinforced, filled or unfilled plastic (such as a polyamide, polyester, polycarbonate, polypropylene, polystyrene, ABS, polyamide imide (PAI) or a mixture thereof), natural material (such as wood, flax, sisal, jute, hemp or a mixture thereof) and/or paper (such as multi-layer paper, cardboard, resin-impregnated paper or a mixture thereof).

Clause 27. The method of clause 25 or clause 26, wherein the core comprises cavities, such as angular or round channels, pores or bubbles.

Clause 28. The method of one of clause 25 to clause 27, wherein the core has a corrugated, angled, honeycomb or foam-like profile, such as corrugated metal or corrugated cardboard.

Clause 29. The method of one of clause 25 to clause 28, wherein the core has a thickness of 5 to 50 millimeters and/or the core has a density of 10 to 1000 kg/m$^3$.

Clause 30. The method of one of clause 25 to clause 29, wherein the fiber layer comprises a fiberglass mat, a chopped fiberglass strand mat, a random layer of fiberglass, a fiberglass fabric, cut or ground glass or mineral fibers, a natural fiber mat, a knitted fabric, a cut natural fiber or fiber mat, a non-woven or knitted fabric based on polymer, carbon or aramid fibers, or a mixture thereof, such as where the natural fiber comprises flax, sisal, jute, hemp or a mixture thereof.

Clause 31. The method of one of clause 25 to clause 30, wherein the thickness of the fiber layer is 0.1 to 2 millimeters and/or the weight per unit area of the fiber layers is 225 to 1200 g/m$^2$.

Clause 32. The method of one of clause 25 to clause 31, wherein the polyurethane resin partially or entirely fills cavities of the core.

Clause 33. The method of one of clause 25 to clause 32, wherein the polyurethane is formed from a one-component or multi-component polyurethane forming system and is foaming or non-foaming.

Clause 34. The method of one of clause 25 to clause 33, wherein the polyurethane is a polyurethane resin comprising the reaction product of a reaction mixture comprising: (1) at least one polyisocyanate; (2) at least one polyol constituent with an average OH number from 300 to 700, comprising, in some embodiments, at least one short-chain and one long-chain polyol, the initial polyols having a functionality of 2-6; (3) water; (4) activators; (5) stabilizers; and, optionally, (6) other auxiliary materials, mold release agents and additives, such as where the polyol constituent comprises a polyester polyol and/or a polyether polyol, the polyisocyanate comprises a polymeric isocyanate of the diphenylmethane disocyanate series (pMDI types), a prepolymer thereof, or crude MDI, water is employed in an amount of 0.1 to 3.0, such as 0.3 to 2.0 parts, per 100 parts of the polyol formulation, the activators comprises an amine or metal salt, and/or the stabilizer comprises polyether siloxane, such as a water-soluble polyether siloxane.

Clause 35. The method of one of clause 25 to clause 34, wherein the weight per unit area of the polyurethane is 400 to 1200 g/m$^2$.

Clause 36. The method of one of clause 25 to clause 35, wherein the polyisocyanate comprises an aliphatic, cycloaliphatic, araliphatic, aromatic and/or heterocyclic polyisocyanate, such as those of the formula:

in which n is 2, 3 or 4 and Q is an aliphatic hydrocarbon radical with 2 to 18, such as 6 to 10 carbon atoms, a cycloaliphatic hydrocarbon radical with 4 to 15, such as 5 to 10 carbon atoms, an aromatic hydrocarbon radical with 6 to 15, such as 6 to 13 carbon atoms, or an araliphatic hydrocarbon radical with 8 to 15, such as 8 to 13 carbon atoms.

Clause 37. The method of one of clause 25 to clause 36, wherein the polyisocyanate comprises ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3- and -1,4-cyclohexane diisocyanate and any mixtures of these isomers, 1-isocyanato-3,3,5-trimethyl-5-isocyanatomethyl cyclohexane, 2,4- and 2,6-hexahydrotoluylene diisocyanate and any mixtures of these isomers, hexahydro-1,3- and -1,4-phenylene diisocyanate, perhydro-2,4'- and -4,4'-diphenylmethane diisocyanate, 1,3- and 1,4-phenylene diisocyanate, 1,4-durene diisocyanate (DDI), 4,4'-stilbene diisocyanate, 3,3'-dimethyl-4,4'-biphenylene diisocyanate (TODI), 2,4- and 2,6-toluylene diisocyanate (TDI) and any mixtures of these isomers, diphenylmethane-2,4'- and/or -4,4'-diisocyanate (MDI), naphthylene-1,5-diisocyanate, triphenylmethane-4,4',4''-triisocyanate, polyphenyl-polymethylene polyisocyanates, as obtained by condensation of aniline with formaldehyde and subsequent phosgenation, m- and p-isocyanatophenylsulfonyl isocyanates, perchlorinated aryl polyisocyanates, polyisocyanates having carbodiimide groups, norbornane diisocyanates, polyisocyanates having allophanate groups, polyisocyanates having isocyanurate groups, polyisocyanates having urethane groups, polyisocyanates having acylated urea groups, polyisocyanates having biuret groups, polyisocyanates produced by telomerisation reactions, polyisocyanates having ester groups, reaction products of the above-mentioned isocyanates with acetals and polyisocyanates containing polymer fatty acid esters, or a mixture of any two or more of the above-named polyisocyanates.

Clause 38. The method of one of clause 25 to clause 37, wherein the polyisocyanate comprises a prepolymer having isocyanate groups produced by reacting a polyol and/or chain extender and/or crosslinking agent with at least one aromatic diisocyanate from the group TDI, MDI, TODI, DIBDI, NDI, DDI, such as 4,4'-MDI, to produce a polyaddition product having urethane groups and isocyanate groups with an NCO content of 6 to 25 wt. %.

Clause 39. The method of one of clause 25 to clause 39, wherein the polyisocyanate comprises a methylene-bridged polyphenyl polyisocyanate and/or a prepolymer of a methylene-bridged polyphenyl polyisocyanate having an average functionality of from 1.8 to 3.5, such as from 2.0 to 3.1, isocyanate moieties per molecule, and an NCO content of from 20 to 32 weight percent.

Clause 40. The method of one of clause 25 to clause 39, wherein the polyether polyol has a molecular weight of 800 to 14,000 Da or 1,000 to 8,000 Da, and/or a functionality of 2.4 to 8 or 2.5 to 3.5.

Clause 41. The method of one of clause 25 to clause 40, wherein the polyether polyol comprises a polyoxyethylene glycol, triol, tetrol or higher functionality polyoxyethylene polyol, a polyoxypropylene glycol, triol, tetrol or higher functionality polyoxyethylene polyol, or a mixture of any two or more thereof, such as where the polyether polyol is produced from a starter or initiator comprising ethylene glycol, propylene glycol, diethylene glycol, dipropylene glycol, tripropylene glycol, trimethylol-propane, glycerol, pentaerythritol, sorbitol, sucrose, ethylenediamine, and toluene diamine, or a mixture of any two or more thereof.

Clause 42. The method of one of clause 25 to clause 41, wherein the reaction mixture comprises a low-molecular difunctional chain extender, tri- or tetrafunctional crosslinking agent, or a mixture of chain extender and crosslinking agent, such as where the chain extender comprises an alkanediol or a dialkylene glycol, and the crosslinking agent comprises a 3- or 4-valent alcohol and/or an oligomeric polyalkylene polyol with a functionality of 3 to 4 and a molecular weights of <750 g/mol, such as 18 to 400 g/mol or 60 to 300 g/mol.

Clause 43. The method of clause 42, where the chain extender and/or crosslinking agent is present in an amount of no more than 50% by weight, such as no more than 20% by weight, such as 1 to 50% by weight or 2 to 20% by weight, based on the total weight of isocyanate-reactive ingredients in the reaction mixture.

Clause 44. The method of one of clause 25 to clause 43, wherein the fatty acid ester is present in an amount of 0.5 to 5% by weight, based on the total weight of the reaction mixture.

Clause 45. The method of one of clause 25 to clause 44, wherein the fatty acid ester comprises the ester reaction product of a fatty acid having 5 to 32 carbon atoms, such as 12 to 22 carbon atoms, with a monhydric or polyhydric alcohol having 2 to 30 carbon atoms, such as 2 to 22 carbon atoms, such as where the fatty acid comprises a saturated fatty acid, such as caproic acid, caprylic acid, undecylic acid, lauric acid, tridecylic acid, myristic acid, stearic acid, behenic acid, lignoceric acid, cerotic acid, montanic acid, and/or melissic acid, and/or unsaturated fatty acid, such as oleic acid, elaidic acid, linolic acid, linolenic acid, arachidonic acid, brassidic acid, erucic acid, and/or ricinolic acid, as well as mixtures of any two or more thereof, and/or where the alcohol comprises a monol, such a propyl, isopropyl, butyl, octyl, capryl, lauryl, myristyl, stearyl, and behenyl alcohol, and/or a polyol, such as ethylene glycol, propylene glycol, butanediol, glycerin, trimethylol propane, pentaerythritol, isotridecanol, and neopentyl glycol, as well as mixtures of any two or more thereof.

Clause 46. The method of one of clause 25 to clause 45, wherein the fatty acid ester has an isocyanate-reactive, such as hydroxyl, functionality of 1 to 2 and/or a hydroxyl number of at least 10 mg KOH/gram, such as 10 to 50 mg KOH/gram or 10 to 20 mg KOH/gram.

Clause 47. The method of one of clause 25 to clause 46, wherein the laminated part is a roof, bonnet, rear wing, door or bottom plate module, or load floor.

The non-limiting and non-exhaustive examples that follow are intended to further describe various non-limiting and non-exhaustive implementations without restricting the scope of the implementations described in this specification.

EXAMPLES

The mold used for the experiments described below was a 12 inch by 8 inch by 0.125 inch plaque tool. The mold was installed on a press adjacent to a small cylinder type RIM machine. The mold had an edge gate injection site with a "peanut" style after mixer. The mold was heated with water lines to 175° F. The heat was maintained with electric thermolator units circulating water at the required temperature.

For each experiment, the tool was cleaned completely using Chem Trend Mold cleaner MOC-10003(N-Methyl pyrrolidone) to remove any residual external mold release and then wiped with water to neutralize any leftover mold cleaner. The tool was prepared by spraying a coating of an external mold release (listed in Table 1), buffed with a soft cloth and sprayed once more with the external mold release.

For each experiment, the RIM machine throughput was set at 500 grams/second and the material temperatures were maintained at 110° F. for the "B" POLYOL SIDE and 100° F. for the "A" ISO SIDE. The shot weight was set for 230 grams total and the material was injected into the tooling. The tool was kept closed for 40 seconds before separating the two halves and opening the tool and demolding the part.

The "B" POLYOL SIDE was prepared using the following ingredients in the same amounts for each experiment: 1) a polyol blend that was a mixture of i) 83.2 parts of a glycerine based triol polyol with a molecular weight of 4700, ii) 3.74 parts of ethylene glycol, and iii) 2.06 parts of an ethylenediamine-started tetra functional polyol having a molecular weight of 356; triethylenediamine catalyst, sold as Dabco® 33LV by Evonik; 3) a tin carboxylate catalyst sold as Fomrez® UL-38 by Momentive, 4) CAT C a blocked DBU catalyst sold as Niax A-575 by Momentive; a delayed action tertiary amine catalyst available as Dabco® 1028 from Evonik; 6) a pigment dispersion of carbon black and black dye supplied as Colormatch DR-2205 from Chromaflo; and 7) a package of antioxidants supplied in liquid form as Tinuvin B-75 from Chromaflo. In addition, the "B" POLYOL SIDE contained an additive as listed in Table 1, in the amount listed (% by weight, based on the total weight of the "B" POLYOL SIDE). In each case, the "A" ISO SIDE was a liquid modified 4,4-diphenylmethane-diisocyanate (MDI) prepolymer having an average NCO group number between 22.6-23.1, and a viscosity at 25° C. between 550-800 cps, and the "B" POLYOL SIDE was mixed with the "A" ISO SIDE at a weight ratio of 100:47 "B" POLYOL SIDE to "A" ISO SIDE.

ADDITIVE A: LOXIOL® G 71, a fatty acid ester lubricant having a hydroxyl functionality of 1.5 and an OH number of 12.5 mg KOH/gram, commercially available from Albemarle.

ADDTIIVE B: MoldWiz® INT-1324, a fatty acid ester lubricant believed to contain no isocyanate-reactive functionality, commercially available from Axel Plastics Research Laboratories, Inc.

EMR-1: XTEND™ W-7806R, an aqueous emulsion of resins and surfactants that crosslink to form a semi-permanent release film, commercially available from Axel Plastics Research Laboratories, Inc.

EMR-2: XTEND™ W-4016, an aqueous emulsion of resins, crosslinkers and surfactants that crosslink to form a semi-permanent release film, commercially available from Axel Plastics Research Laboratories, Inc.

EMR-3: XTEND™ 19RSS, an air-drying reactive resin solution that cures to a cross-linked semi-permanent coating, organic solvent based, commercially available from Axel Plastics Research Laboratories, Inc.

EMR-4: Chem Trend PU-12004: a naptha based wax emulsion available from Chem-Trend L.P.

TABLE 1

| Example | Additive | Amount (% by weight) | External Mold Release Used |
|---------|----------|----------------------|----------------------------|
| 1 | A | 5 | EMR-1 |
| 2 | A | 5 | EMR-2 |
| 3 | B | 5 | EMR-3 |

TABLE 1-continued

| Example | Additive | Amount (% by weight) | External Mold Release Used |
|---------|----------|----------------------|----------------------------|
| 4 | B | 5 | EMR-4 |
| 5 | B | 5 | EMR-2 |
| 6 | A | 5 | EMR-4 |
| 7 | A | 5 | EMR-3 |

Each example was evaluable for the number of releases that was achieved on a single application of EMR as well as for surface quality of the laminated part. Results are in Table 2.

| Example | # of releases | Surface Quality |
|---------|---------------|-----------------|
| 1 | 10+ | Slippery/spots |
| 2 | 11 | Surface dry, stretched the part |
| 3 | 12 | ADDITIVE bled out of part after 24 hours |
| 4 | 18 | ADDITIVE bled out of part after 24 hours |
| 5 | 10 | ADDITIVE bled out of part after 24 hours |
| 6 | 11* | Surface of good quality, easy release* |
| 7 | 10 | Spotty surface after 5 releases |

*The part was demolded with little effort and the surface was free from defects or excess mold release. The surface had a "grippy" feel to it. The part was then trimmed to a final weight of between 205 and 210 grams, resulting in a molded density of about 65 pounds per cubic foot. The shots were repeated, with no further application of external mold release being applied. It was determined that the part stuck and became deformed after about 15 shots. The mold release was then reapplied by using only one spray application and the experiment was repeated resulting in another 15 shots before the part stuck. At this time it was deemed that multiple releases with good part surface quality had been achieved. With no ADDITIVE A in the polyol blend, and using the same external mold release, only one part could be demolded successfully. A second shot with that version of polyol resulted in the part sticking and deforming.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A laminated part comprising:
    (a) a core;
    (b) a fiber layer arranged on each side of the core and impregnated with a polyurethane resin, and
    (c) an outer layer that is distinct from the polyurethane resin that impregnates the fiber layer and that at least partially coats at least one of the polyurethane impregnated fiber layers,
    wherein the outer layer has a Class A surface and is the cured reaction product of a reaction mixture comprising:
        (1) a polyisocyanate;
        (2) a polyether polyol having a molecular weight of 800 Da to 25,000 Da and a functionality of 2 to 8; and
        (3) 0.5 to 15% by weight, based on the total weight of the reaction mixture, of a fatty acid ester having an isocyanate-reactive functionality of at least 1 and a hydroxyl number of 10 to 20 mg KOH/grain.

2. The laminated part of claim 1, wherein the core has a honeycomb profile.

3. The laminated part of claim 2, wherein the core is constructed of cardboard.

4. The laminated part of claim 2, wherein the fiber layer comprises a fiberglass mat, a chopped fiberglass strand mat, a random layer of fiberglass, a fiberglass fabric, cut or ground glass or mineral fibers, a natural fiber mat, or a knitted fabric.

5. The laminated part of claim 1, wherein the polyurethane at least partially penetrates the fiber layers and the core.

6. The laminated part of claim 1, wherein the reaction mixture used to form the outer layer comprise 0.5 to 5% by weight, of the fatty acid ester.

7. The laminated part of claim 1, wherein the fatty acid ester has a hydroxyl functionality of 1 to 2.

8. The laminated part of claim 1, wherein the fatty acid ester has a hydroxyl functionality of 1 to 1.5.

9. The laminated part of claim 1, wherein the polyether polyol having a molecular weight of 800 Da to 25,000 Da and a functionality of 2 to 8 is present in an amount of at least 50% by weight, based on the total weight of isocyanate-reactive ingredients in the reaction mixture.

10. The laminated part of claim 9, wherein the polyether polyol having a molecular weight of 800 Da to 25,000 Da and a functionality of 2 to 8 is present in an amount of at least 80% by weight, based on the total weight of isocyanate-reactive ingredients in the reaction mixture.

11. The laminated part of claim 10, wherein the polyether polyol having a molecular weight of 800 Da to 25,000 Da and a functionality of 2 to 8 is the alkoxylation reaction product of an alkylene oxide and an initiator selected from the group consisting of ethylene glycol, propylene glycol, diethylene glycol, dipropylene glycol, tripropylene glycol, trimethylol-propane, glycerin, pentaerythritol, sorbitol, sucrose, ethylenediamine, toluene diamine, or a mixture of any two or more thereof.

12. The laminated part of claim 11, wherein the polyether polyol having a molecular weight of 800 Da to 25,000 Da and a functionality of 2 to 8 has a molecular weight of 1,000 to 8,000 Da and a functionality of 2.5 to 3.5.

* * * * *